J. Z. LEWIS.
SEED SEPARATING DEVICE.
APPLICATION FILED JAN. 19, 1917.
1,278,951.
Patented Sept. 17, 1918.
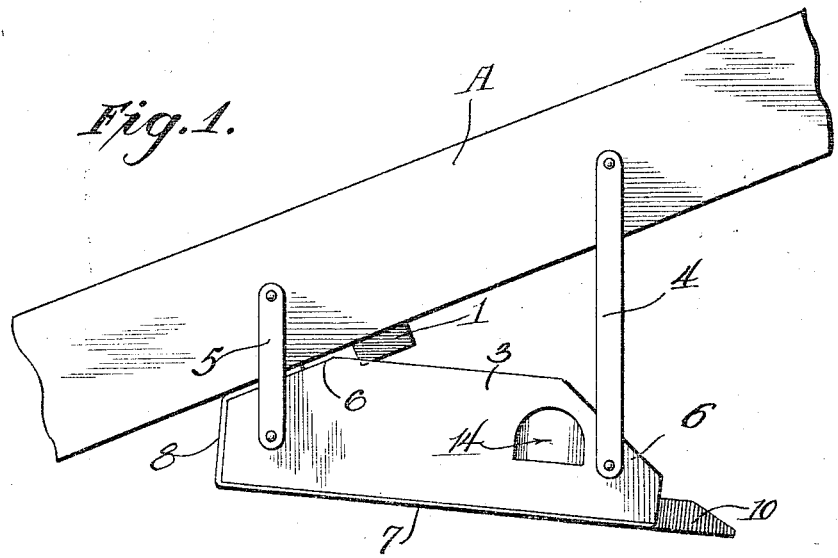
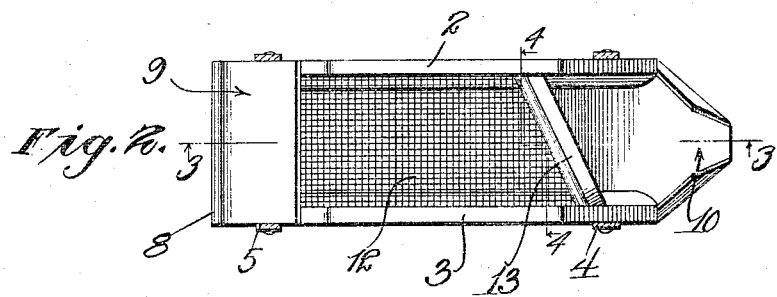
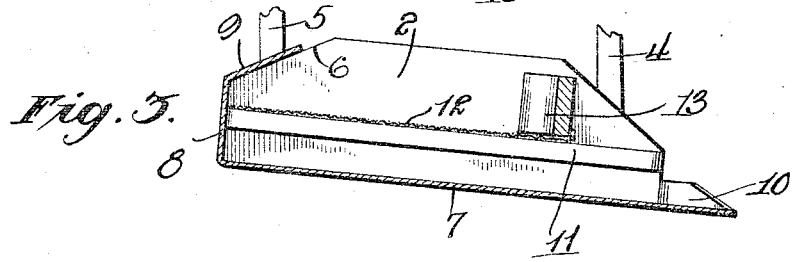
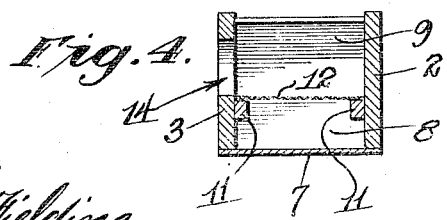
WITNESSES
W. C. Fielding.
Wm. H. Mulligan
INVENTOR
John Z. Lewis,
BY Richard Owen.
ATTORNEY

UNITED STATES PATENT OFFICE.

JOHN Z. LEWIS, OF INGRAHAM, ILLINOIS.

SEED-SEPARATING DEVICE.

1,278,951.

Specification of Letters Patent.

Patented Sept. 17, 1918.

Application filed January 19, 1917. Serial No. 143,375.

*To all whom it may concern:*

Be it known that I, JOHN Z. LEWIS, a citizen of the United States, residing at Ingraham, in the county of Clay and State of Illinois, have invented certain new and useful Improvements in Seed-Separating Devices, of which the following is a specification.

This invention relates to a seed separating device and the primary object of the invention is to provide an attachment to be used in connection with the ordinary elevator employed on grain separators whereby the spurious seeds such as buckhorn, red clover, weed seed and all other similar objectionable seeds that are larger than timothy will be separated so that only the desired seed will be ejected at the end of the sifter.

One of the objects of the invention is to provide a sifting device that will separate the different species of seeds as they are dropped from the conveying elevator and including means for ejecting the spurious seeds at one side of the device while the seeds desired to be preserved will be ejected from the end of the device through a trough provided for this purpose.

A further object of this invention is the provision of a seed separating device which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a side elevation showing a portion of an elevator disposed at the angle commonly employed on separators and having the sifting or separating attachment applied thereto.

Fig. 2 is a top plan view of the attachment.

Fig. 3 is a section on the line 3—3 of Fig 2, and

Fig. 4 is a section on the line 4—4 of Fig. 2.

Referring to the drawing, wherein is illustrated the preferred form of my invention, and in which like numerals of reference indicate corresponding parts throughout the several views, the elevator A is designed to carry the grain in the usual manner through its interior. A discharge spout 1 is in communication with an opening formed in the bottom of the elevator and through this spout the seeds are ejected to be received on the sifting or separating attachment.

The sifting or separating attachment comprises a channel-like structure having elongated side walls 2 and 3 to which are connected the ends of the hangers 4 and 5. The opposite ends of these hangers are fastened to the elevator A so that the attachment will be suspended from the elevator in the manner shown by Fig. 1 of the drawing. The ends of the upper edges of the side walls 2 and 3 are cut off to provide the angular end edges 6. A bottom wall for the channel is constructed from a strip of metallic material of suitable width which has its marginal edges fastened to the lower edges of the side walls 2 and 3. At the rear end, the bottom wall 7 is bent at right angles to form the rear end wall 8 and the end of this strip which forms the bottom wall 7 and the end wall 8 is again bent to contact with the angular edges 6 thus forming an angularly disposed covering 9 for the rear end of the sifter. The angularly disposed covering 9, as illustrated clearly in Fig. 3, is in engagement with the bottom of the elevator A and consequently the covering 9 is disposed at the same angle as the elevator. The sifting attachment, of course, is agitated by swinging it on the hangers 4 and 5 and since it is necessary for the seeds to pass through the chute 1 from the elevator A, it will be obvious that a stop for the rearward movement is obtained by virtue of the contact of the cover portion 9 with the bottom of the elevator. This causes the rearward swing of the attachment to stop at a point that will cause the grain to have sufficient sifting surface to accomplish the sifting operation before reaching the outlet. The forward end edge of the bottom wall is extended beyond the ends of the side walls and its side edges are bent upwardly to provide the chute 10 through which the seeds are ejected after being thoroughly sifted and separated from the spurious seeds.

Fastened to the inner surface of each side wall 2 and 3 and spaced above the bottom wall 7 is a cleat 11 to which is fastened the marginal edges of a screen 12 the rear end of which terminates at the rear wall 8. Disposed adjacent the forward end of the channel embraced by the side walls 2 and 3 is a deflecting wall 13 which has its ends mounted upon the cleats 11 at the opposite sides of the channel and is disposed at an angle as shown by Fig. 2 of the drawing. The forward end edge of the screen 12 is fastened to the lower edge of a deflecting wall 13 thereby forming an obstruction for the seeds that are received on the screen 12 and which cannot pass therethrough. Formed in the wall 3 adjacent the forward end thereof is an outlet opening 14 through which the spurious seeds are ejected when they are deflected toward the opening by the angular wall or partition 13.

In operation, the seeds will be dropped through the spout 1 from the elevator A and deposited on the screen 12. The screen is preferably constructed from number 20 wire mesh as this has been found most desirable for the purpose of retaining the spurious seeds while permitting the seeds of the similar variety to pass through the screen. Any suitable container may be placed beneath the chute 10 so that the desired seeds may be received when they are ejected from the chute. The spurious seeds will, of course, move toward the front of the screen and be deflected toward the opening 14 by the angularly disposed partition 13. The seeds will thereby be separated and all foreign and objectionable seeds may be received in a separate container.

I claim:

In a seed separating device, the combination with an inclined support, of parallel side walls disposed below the support, each wall having one end cut to form an angularly butt end edge, hangers pivotally connected to the said support and to the said walls to suspend the latter below the said support, the said hangers being of different lengths whereby the said angularly cut ends are held in close proximity to the said support, a bottom attached to the lower edges of the said walls and extending the full length thereof and having a right angularly extending portion forming a rear end wall engaged with the ends of the said side walls the said end wall being extended and engaged with the said angularly cut ends of the side walls to form a covering above one end of the space between the said side walls, and normally held at the same angle as the said support and in engagement with the latter, a chute projecting from the opposite end of said bottom wall and sifting means arranged between the said side walls and spaced above the said bottom.

In testimony whereof I affix my signature in presence of two witnesses.

JOHN Z. LEWIS.

Witnesses:
 DANIEL C. CAINE,
 WM. G. BIRCH.

Copies of this patent may be obtained for five cents each, by addressing the "Commissioner of Patents, Washington, D. C."